Dec. 9, 1952  S. J. PODVINECZ ET AL  2,620,705
FASTENING DEVICE
Filed Aug. 3, 1946
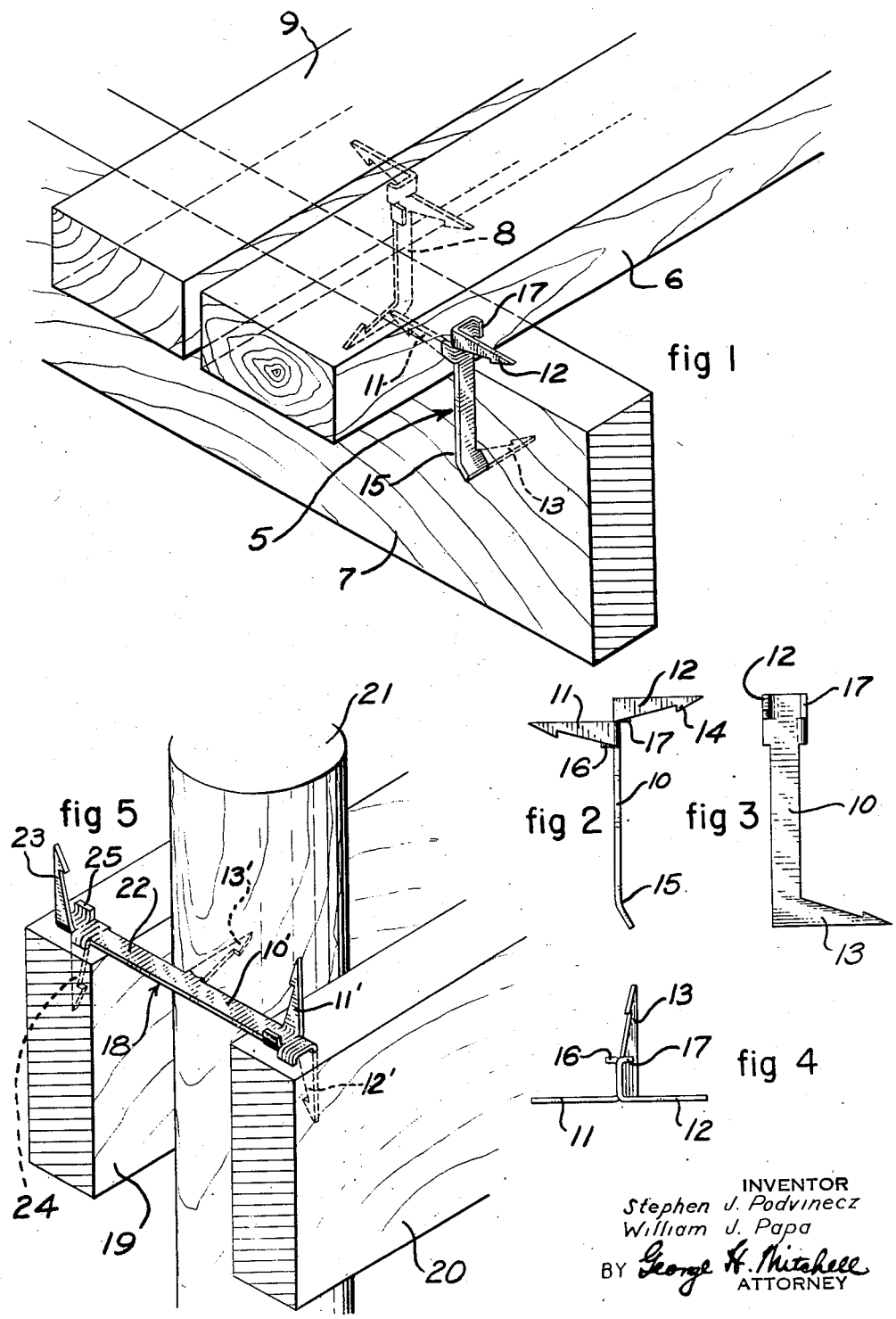
INVENTOR
Stephen J. Podvinecz
William J. Papa
BY George H. Mitchell
ATTORNEY Patented Dec. 9, 1952

2,620,705

UNITED STATES PATENT OFFICE 2,620,705

FASTENING DEVICE

Stephen J. Podvinecz, New York, and William J. Papa, Bayside, N. Y.; Dorothy Parry Podvinecz administratrix of said Stephen J. Podvinecz, deceased Application August 3, 1946, Serial No. 688,208

4 Claims. (Cl. 85—13)

Our invention relates to fasteners and in particular to simple unitary devices for permanently securing a plurality of structural members together.

Conventionally, in laying planks on stringers or transversely extending support beams, as in a boardwalk, nails are driven through the planks and into the beams or stringers. Due partly to vibration caused by traffic and also partly to severe weather and other wear, these nails loosen all too frequently. Almost continuous maintenance is thus necessary if satisfactory service is to be obtained from such a structure.

It is, accordingly, a general object of our invention to provide an improved device for securing structural members together, such device imparting greater permanency to the structure formed by said members.

It is another object to provide an improved means for securely holding together a plurality of weather-exposed structural members substantially independent of the hot-and-cold and wet-and-dry cycles of the weather.

A specific object is to provide an improved means for more permanently securing the structural members of a boardwalk, whereby reduced maintenance costs are obtained.

It is another specific object to provide means whereby the life and utility of existing boardwalk and similar weather-exposed structures may be extended, without the extensive use of new lumber.

It is a further object to provide an improved means for securing structural members together without exposing any of the securing means externally of the members secured thereby.

Other objects and various features of novelty and invention will be pointed out or will occur to those skilled in the art from a reading of following specification in conjunction with the drawings, in which:

Fig. 1 is a fragmentary isometric view showing fastening devices of the invention as applied to the securing of boardwalk planks to a supporting beam;

Figs. 2, 3, and 4 are front-elevation, side-elevation, and plan views, respectively, of the type of fastening device shown in Fig. 1; and Fig. 5 is a fragmentary isometric view showing a modified fastening device as applied to the securing of cross-pieces to a pile, pole, or other type column.

Broadly speaking, our invention contemplates a fastening device having a longitudinally extending shank. A first prong member extends from the shank and generally normal thereto, and two further prong members extend from the shank in opposite directions which are both generally normal to the shank and to the first prong member. The first prong member is spaced along the shank from the part with which the last two prong members are formed. In the specific preferred forms to be described, the improved fasteners are each formed from single pieces of sheet metal, the prong members being provided with wedge-shaped wood-piercing profiles.

Referring to Figs. 1 through 4 of the drawings, a preferred fastening device 5 is shown performing the function of securing a boardwalk plank 6 to a supporting beam member 7. A second similar fastener 8 secures adjacent planks 6 and 9 to each other and to the supporting beam 7. In the preferred form shown, the fastening devices are each formed from a single piece of sheet metal. Each comprises a generally longitudinally extending shank portion 10 with two wood-piercing prong members 11 and 12 extending from one end thereof and a single wood-piercing prong member 13 extending from the other end. Prong members 11 and 12 preferably extend in opposite directions generally normal to the longitudinal axis of the shank 10, and the prong member 13 preferably extends normal to prong members 11 and 12 and to the longitudinal axis of shank 10.

It will be seen that with the structure described, the prong members 11 and 12 may be utilized in the construction of a boardwalk to secure two adjacent planks to each other, while the prong member 13, off-set by the shank 10, is sunk into the supporting beam 7 to hold the planks down. In the form shown, each prong member is provided with a profile which will tend not only to assure an extremely tight initial fit, but also to retain this fit for a prolonged period of time. This profile, which is perhaps shown best in Figs. 2 and 3, is characterized by a pointed wedge the extended surface of which forms a slightly obtuse mean angle with the shank 10. For example, the upper edge of prong 11 forms substantially a right angle with the shank axis, and the lower edge forms a markedly obtuse angle therewith. To assure permanency of fit the tips of these wedges may include barbs, as at 14, which will clearly resist withdrawal of the fastener once it has been driven into a member to be secured.

In utilizing the fastener which has been described the lower prong member 13 is first driven into the support beam 7. If desired the flat surface of prong 13 may be driven across or diagonally of the grain of the beam as shown for the case of the fastener 5 in Fig. 1. Either before or after this operation the shank 10 may be bent as at 15 in order to bring the prong 11 into position for driving entry into the stringer 6. It will be clear that, upon a proper selection of the point at which the prong 13 is driven into the beam 7, the shank 10 will be substantially vertical when the prong 11 is fully driven into the plank 6. Prong 12 is then driven into the next plank (not shown) which will lie adjacent plank 6, and this operation may be performed by hammering the new plank so that it will slide along the top edge of beam 7 into its final place adjacent stringer 6. It will be clear that in the described method of utilizing our improved fastener the profiles of the various prong members serve to hold adjacent stringers against spreading from each other and also to clamp all planks tight against the supporting beam 7.

It will be apparent that with the device as described the space between adjacent planks will be determined by the thickness of the shank 10. In many applications this space may prove insufficient to allow for proper drainage. In order to accomplish a desired spacing, spacer lugs 16 and 17 may be formed from the same single piece of material as the entire fastener. In the form shown, these spacer lugs are bent from the shank 10 at points substantially opposite those from which prongs 11 and 12 extend.

Referring to Fig. 5 we show an alternative arrangement in which a fastener 18 is employed to secure two parallel stringers 19 and 20 to a supporting pole or other structural column 21. Elements of the fastener 18 will be recognized from the description of the simpler structure of Figs. 1 through 4, the difference being that in the fastener 18 the shank 22 is more extended so as to permit the provision of further wood-piercing prong members 23 and 24 at the extended end thereof. In use, it will be clear that prong member 13' may first be driven into the column or pole 21 and that the vertically extending outer prong members 11'—12', and 23—24 may then be driven into the stringers which they support and secure. Again, if desired, spacer lugs may be provided as at 25. It will be noted that the wedge-and-locking action described above for the profiles of prong members 11, 12, and 13 (Figs. 1–4) is similarly effective for prong members in the arrangement of Fig. 5.

It will be clear that we have described relatively simple, easily fabricated devices for connecting and securing a plurality of structural members together. These devices not only secure such members, but also clamp them against each other in such a way that their fit is substantially unaffected by weather and other wear. It should be noted that since the stringer or plank-engaging prongs enter the members to be secured along surfaces not excessively exposed to wear, a completed job is relatively permanent. Futhermore, particularly in the case of boardwalks, the property of our fastener to utilize relatively unexposed surfaces renders the device adaptable to the resecuring of old nail-secured planks which have become worn on their upper surfaces. Also, since our fastener may be sunk into the edge of a plank well below the outer exposed surface thereof, very substantial wear of this exposed surface may be tolerated before any part of the fastener will protrude to develop a snag nuisance.

While we have described our invention in detail for the preferred forms shown, it will be understood that modifications may be made without departing from the scope of the invention as defined in the following claims.

We claim:

1. In a fastening device formed from a single piece of sheet metal, a longitudinally extending substantially flat shank, a first point-tipped wood-piercing prong member extending generally normal to said shank and substantially in the plane of said shank, two point-tipped wood-piercing prong members laterally extending in opposite directions in a plane substantially perpendicular to the plane of said shank, said prong members extending from said shank and at a slightly obtuse angle thereto, and a spacing member for each of said last-mentioned two prong members to limit penetration thereof projecting from said shank generally parallel to and spaced from the prong member with which it so coacts.

2. In a fastening device, a longitudinally extending shank, a point-tipped prong member integral with said shank and extending generally normal to the longitudinal axis thereof from a point substantially midway along the length of said shank, two point-tipped prong members integrally formed with said shank and laterally extending from one end thereof in opposite directions that are generally normal to said shank and to said first prong, and two further point-tipped prong members integrally formed with said shank and laterally extending from the opposite end of said shank in opposite directions that are generally normal to said shank and to said first prong member.

3. In a fastening device formed integrally from a single piece of sheet metal, a longitudinally extending flat shank provided with two flat point-tipped prong members laterally extending in opposite directions from one of the lengthwise margins of the shank offset lengthwise of the shank with respect to each other in a plane perpendicular to the plane of the shank, two flat spacing members for positively limiting the penetration of said prong members respectively laterally extending in opposite directions from the other of the lengthwise margins of the shank offset lengthwise of the shank with respect to each other in a plane spaced from and substantially parallel to the plane of said prong members, and a third flat point-tipped prong member spaced from said first-mentioned two prong members.

4. In a fastening device formed from a single piece of sheet metal, a longitudinally extending flat shank provided at one end with two point-tipped laterally extending prong members and a laterally extending spacing member for each of said two prong members to positively limit penetration thereof, one of said prong members and its coacting spacing member laterally projecting from opposite lengthwise margins of the shank in one direction generally disposed in parallel spaced planes perpendicular to the plane of the shank, the other of said prong members and its coacting spacing member laterally projecting from opposite lengthwise margins of the shank in a direction opposite to said first-mentioned direction generally disposed in said parallel spaced planes and offset lengthwise of the shank with respect to said first prong member and spacing member, and a third point-tipped prong member spaced from said first-mentioned two prong members.

STEPHEN J. PODVINECZ.
WILLIAM J. PAPA.

REFERENCES CITED

The following references are of record in the file of this patent:

UNITED STATES PATENTS

| Number | Name | Date |
|---|---|---|
| 174,659 | Brisley | Mar. 14, 1876 |
| 294,385 | Heimmenway | Mar. 4, 1884 |
| 550,028 | Rordorf | Nov. 19, 1895 |
| 638,386 | Farrow | Dec. 5, 1899 |
| 792,094 | Ware | June 13, 1905 |
| 1,389,540 | Washington | Aug. 30, 1921 |
| 1,454,240 | Kneeland | May 8, 1923 |
| 1,524,228 | Ballantine | Jan. 27, 1925 |
| 1,791,337 | Wendell | Feb. 13, 1931 |
| 1,995,173 | Ehle | Mar. 19, 1935 |
| 2,129,975 | Urbain | Sept. 13, 1938 |
| 2,134,765 | Putnam | Nov. 1, 1938 |
| 2,325,766 | Gisondi | Aug. 3, 1943 |
| 2,353,455 | Gisondi | July 1, 1944 |

FOREIGN PATENTS

| Number | Country | Date |
|---|---|---|
| 828 | Denmark | Nov. 16, 1896 |
| 353,979 | Great Britain | Feb. 19, 1931 |
| 108,746 | Australia | Oct. 6, 1939 |